Nov. 2, 1971 L. F. MIKLOS 3,616,673
COMBINATION ROTATING AND RECIPROCATING RIVET TOOL
Filed Aug. 12, 1969 3 Sheets-Sheet 1
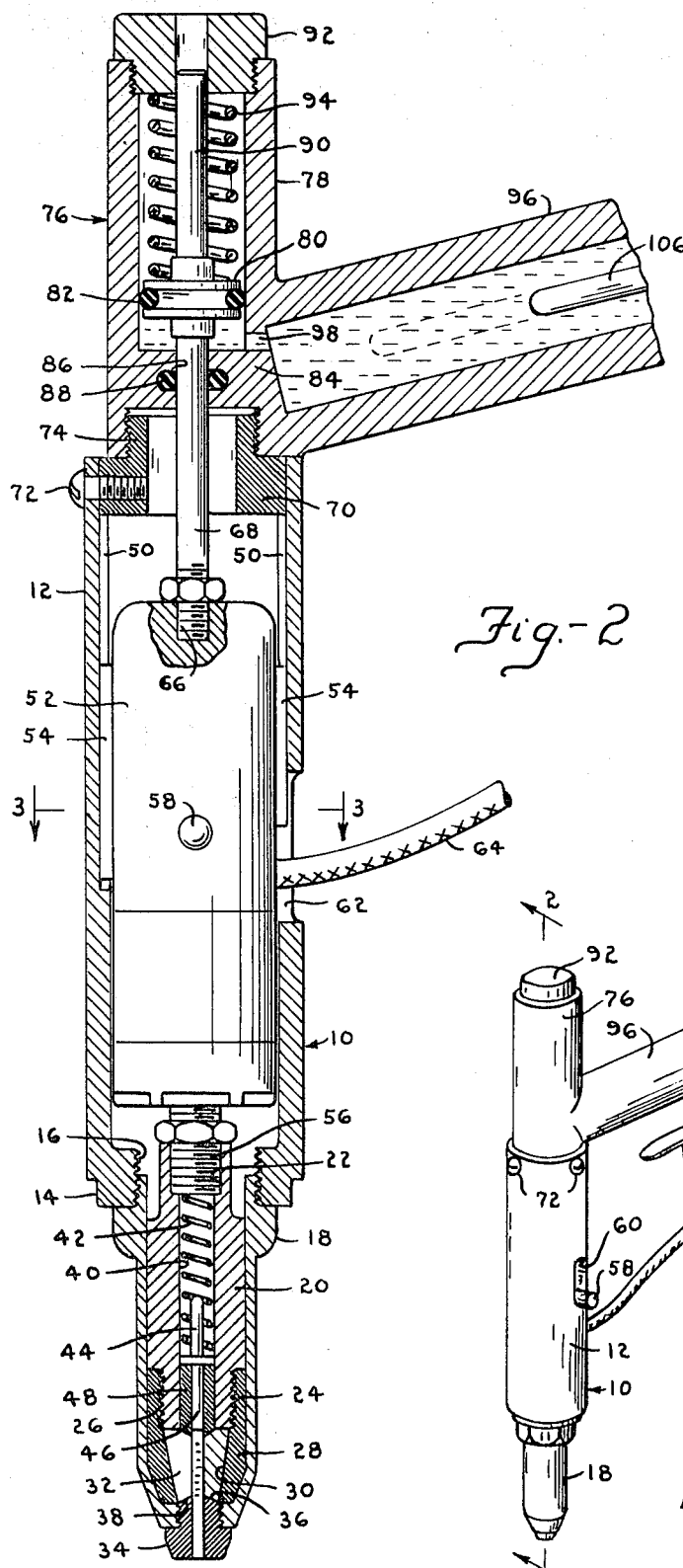
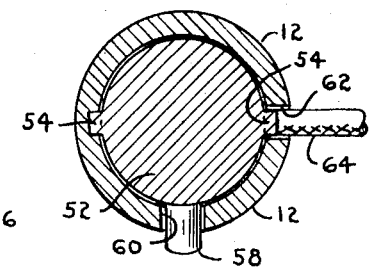
Fig.-3
Fig.-2
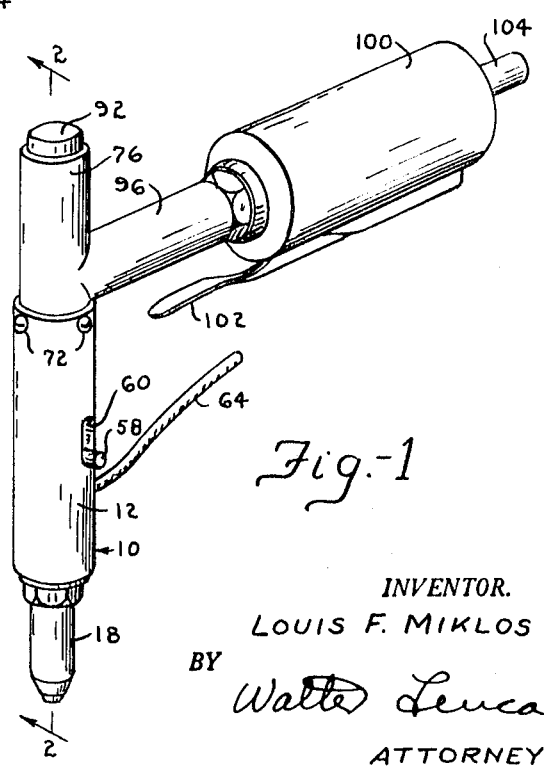
Fig.-1
INVENTOR.
LOUIS F. MIKLOS
BY Walter Leuca
ATTORNEY INVENTOR.
LOUIS F. MIKLOS
BY Walter Lenca
ATTORNEY

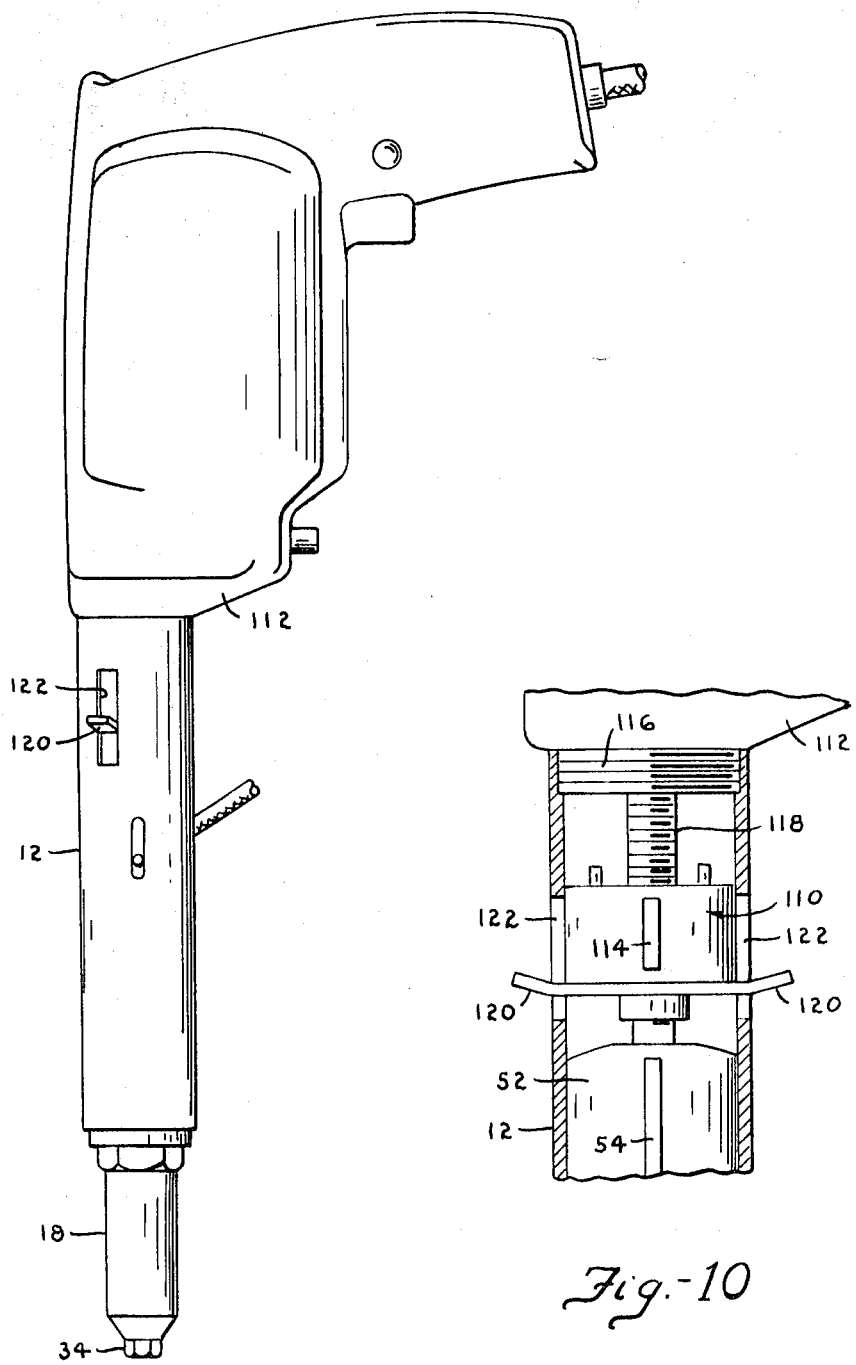

ns patent Office 3,616,673
Patented Nov. 2, 1971

1

3,616,673
COMBINATION ROTATING AND RECIPROCATING
RIVET TOOL
Louis F. Miklos, 6151 Delaware St.,
Gary, Ind. 46409
Filed Aug. 12, 1969, Ser. No. 849,432
Int. Cl. B21d 9/05
U.S. Cl. 72—391              6 Claims

ABSTRACT OF THE DISCLOSURE

A combination rotating and reciprocating tool for holding a blind rivet. It is contemplated that the blind rivet be formed with a drill head which is rotated by the tool for purposes of drilling through panel or structural members to be riveted together. Upon the drilling of the hole through the panel members, the tool is actuated to pull the stem of the rivet to upset the rivet and form the rivet into a fastening element. Further pulling will accomplish the breaking of the stem. This invention accomplishes the entire drilling and riveting operation in rapid sequence.

---

This invention relates generally to a rivet handling tool and more particularly to a device operative to sequentially perform a drilling and pulling operation.

The problem that this invention is directed to is that of providing a single tool for performing the multiple operations of drilling a hole, inserting a blind rivet in the hole and pulling the rivet to annularly expand the flanged tubular sleeve thereof to form an upset head which together with the flanged end serve to fasten structural members together. Further pulling by the tool of this invention causes the stem to rupture and be separated from the rivet body in the conventional manner.

In the prior art practice that I am aware of, structural members such as sheet metal panels for example, are fastened together by drilling holes therethrough which are aligned and a rivet commonly referred to as a blind rivet is inserted therein. This type of rivet to which this invention particularly relates, comprises a tubular member and a pin having a relatively high tensile strength. This pin has at one end a bulbous head for engaging the adjacent end of a tubular member. The stem portion of the pin projects through the tubular member and beyond the other end thereof. The latter end of the tubular member is conventionally formed with a flange for engaging the panel member around the hole therein to provide a seat for the rivet. The tubular body is inserted through the holes in the panels to be riveted together until the flange at the latter end of the tubular member seats against the panel. Then by pulling the projecting stem of the pin with a rivet pulling tool and applying a reactionary force to the flange on the tubular member, the head on the pin will cause an annular and outward expansion of the tubular body projecting beyond the opposite side of the panel to form an annular and expanded head. Following formation of the expanded head, continued tension on the stem breaking it at a notch so located in the stem that after formation of the expanded head, the plane of rupture substantially coincides with the outer side of the flange on the tubular member.

It is apparent that there are two principal operations performed by two separate tools. One being the drilling operation for forming holes in the structural members to be fastened together by these type rivets, and the other being the pulling of the stem of the rivet extending through the tubular member which deforms at one end to provide the clamping action of the rivet until the stem ruptures or snaps off leaving the flanged end and the up-ended tubular body compressingly connecting the panel member through the holes in the structural members. Accordingly, two separate and distinct power tools are currently required to accomplish the fastening operation.

My invention includes a tubular housing adapted to contain a drill motor movable therein only axially. One end of the tubular housing has screw connected thereto a chuck sleeve which contains rivet clamping jaws adapted for rotation in the chuck sleeve. The breech end of the jaw mechanism is formed to screw connect the rotating shaft of the drill motor by which means the jaw mechanism is rotated. The jaw mechanism is also longitudinally movable within the chuck sleeve. The other end of the tubular housing is provided with a reciprocating motor for longitudinally moving a shaft member which is connected at one end thereof to the opposite end of the drill motor by which connection the drill motor is longitudinally movable in its tubular housing and the jaw mechanism connected to the shaft of the drill motor is longitudinally movable in the chuck sleeve. One of the designs of my invention illustrates a hydraulic motor for the reciprocating motive means. Another design of my invention illustrates an electrically driven screw clutch for the reciprocating motive means.

I further provide for the operation of my invention a new and novel blind rivet which I have invented having a head formed with cutting flutes for the drilling operation which is the subject matter of another patent application.

A principal object of my invention is to provide a tool which is manually controlled to sequentially rotate a workpiece when in a fixed axial position and to move the workpiece axially when in fixed angular or non-rotating position.

Another object of my invention is to provide a drill attachment which operates in combination with a rivet puller to sequentially accomplish a drilling and pulling operation.

Other objects and advantages of my invention will become apparent after studying the detailed description while referring to the accompanying drawings which illustrate a preferred embodiment of my invention.

FIG. 1 is a perspective view of the riveting tool of my invention;

FIG. 2 is a side elevation of my invention shown longitudinally sectioned;

FIG. 3 is a cross-sectional view taken along lines 3—3 of FIG. 2;

FIG. 9 is a side elevation of my invention in longitudinal section illustrating another axial motive means; and FIG. 10 is an enlarged view of a fragmentary portion of FIG. 9 showing the connecting arrangement of a screw clutch for converting the rotating motion of an electric motor to a pulling movement.

Figure 4:
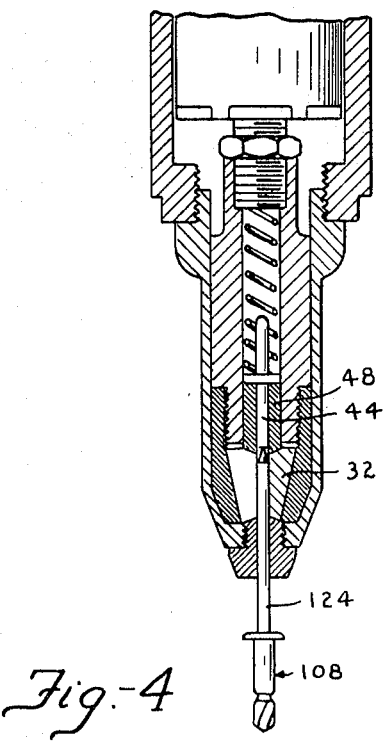
FIGS. 4 through 8 are side elevations of the jaw mechanism of my invention in longitudinal section illustrating its operation.

Referring now to FIGS. 1-8 and particularly FIG. 2, numeral 10 designates generally my invention. The preferred embodiment of my invention 10 comprises a tubular housing 12 having forward end 14 thereof provided with a threaded opening 16 for receiving therein the threaded end of chuck sleeve 18 to obtain a solid connection therebetween, and in effect form a forward extension of the tubular housing. Slidably movable within chuck sleeve 18 is a cylindrical member 20 having the breech end thereof formed with a threaded hole 22, and the forward end thereof reduced in diameter and provided with threads 24 for screw engagement with the threaded end 26 of jaw holding collet 28. Jaw holding collet 28 is formed with its inside cylindrical wall 30 tapered to a reduced diameter at the other end thereof. Contained within the tapered end of collet 28 are jaw elements 32 adapted to cooperate with the tapered cylindrical wall 30 of collet 28 to grip and release a workpiece. A centrally apertured nose plug 34 is screw connected to the other end of chuck sleeve 18, the inside end thereof being conically formed as at 36 which serves to wedge open jaw elements 32. The forward ends of jaw elements 32 are conically recessed as at 38 to make surface contact with the conical end of nose plug 34. Cylindrical 20 is provided with a central hole 40 longitudinally therethrough for receiving therein a coil spring 42 and a collared pin 44, the forward end 46 thereof being journaled in a center hole in guide plug 48 fitted in the other end of cylindrical member 20.

The interior of tubular housing 12 is provided with longitudinal guideways 50. Contained within tubular housing 12 is an electric motor 52; the casing thereof is provided with longitudinal guide elements 54 raised therefrom and adapted to slidably fit in the longitudinal guideways 50 formed in the tubular housing. Electric motor 52 is thereby allowed to be slidably movable axially in tubular housing 12 and rotationally immovable. Shaft end 56 of electric motor 52 is provided with threads for screw connection with threaded hole 22 in cylindrical member 20. I provide electric drill motor 52 with switch means 58 accessible from the exterior of tubular housing 12; accordingly, I provide a slotted opening 60 (FIG. 1) in the side of tubular housing 12 through which switch means 58 may extend. A second slot opening 62 is provided in tubular housing 12 to accommodate electric cord 64 to electric drill motor 52.

The rearward end of electric drill motor 52 is formed with a suitable connecting means such as threaded hole 66 to which is screw connected the threaded end of link rod 68. The rear end of tubular housing 12 is fitted with a coupling member 70 with the connection made therebetween by any convenient means such as screw elements 72. In one of my designs, a reduced part 74 of coupling member 70 is threaded for coupling connection thereto of hydraulic motor 76. Cylinder body 78 of hydraulic motor 76 forms a rearward extension of tubular housing 12 and contains therein for reciprocating movement, a piston 80 provided with a circumferential groove to receive seal ring 82 such as an "O" ring which I have illustrated. Cylinder head 84 is provided with a radially grooved hole 86 which also contains an "O" type seal ring 88 for sealing the clearance between link member 68 and hole 86. The other end of link member 68 is connected to one end of piston 80. The other end of piston 80 is adapted for connecting thereto a guide shaft 90. The other end of cylinder 78 is fitted with a plug 92 having a central hole therethrough for guiding guide shaft 90 in its reciprocating movement. Coil spring 94 encircles guide shaft 90 and serves to bias piston 80 in a forward position in cylinder 78. Hydraulic motor 76 is formed with an obliquely extending conduit 96 for serving as a handle and which communicates with cylinder 78 by means of a port hole 98. Conduit 96 terminates with an air reservoir 100 as shown in FIG. 1. Lever 102 on reservoir 100 is actuated to operate an air valve allowing air under pressure through air holse 104 to move plunger 106 into conduit 96. This causes the displacement of fluid contained in conduit 96 to cylinder 78 via port hole 98 and thereby effect the rearward movement of piston 80 against the bias of spring 94. This action results in pulling electric drill motor 52 together with cylindrical member 20 rearward in tubular housing 12 and chuck sleeve 18, respectively. The taper surface contact between collet 28 and jaw elements 32 is such that any rearward movement of collet 28 will cause jaw elements 32 to radially close upon themselves and firmly grip the workpiece which in this discloseure is the stem of snap rivet 108.

Though I have described a hydraulic motor device to serve as a power unit to produce the motive means for axially pulling or retracting drill motor 52 and cylindrical member 20 in their respective housings, it is to be understood that the drill motor reciprocating means may be accomplished equally as well by other type motive means. For example, in FIG. 9, I show the drill motor reciprocating means as a screw clutch mechanism 110 driven by an electric power unit. The rotating power is supplied by electric motor 112. I modify housing 12 by increasing its length to include screw clutch mechanism 110 which is connected to drill motor 52 in tandem and which slidably moves in housing 12 longitudinally thereof and prevented from rotational movement therein by means of guide elements 114 in guideways 50 of housing 12. The extended end of housing 12 is connected by means of screw 116 to the shaft casing of electric motor 112, the rotating armature of which rotates the longitudinally extending threaded shaft 118, which axially draws thereon the non-rotating screw clutch mechanism 110 when the screw clutch mechanism 110 is actuated to engage the threaded end of rotating shaft 118. Lever and spring means for effecting the engagement and release are not shown in detail since such a screw clutch mechanism is a conventional mechanism and well known in the prior art. Accordingly, the screw clutch mechanism 110 is shown more or less diagrammatically and without detail.

Figure 5:
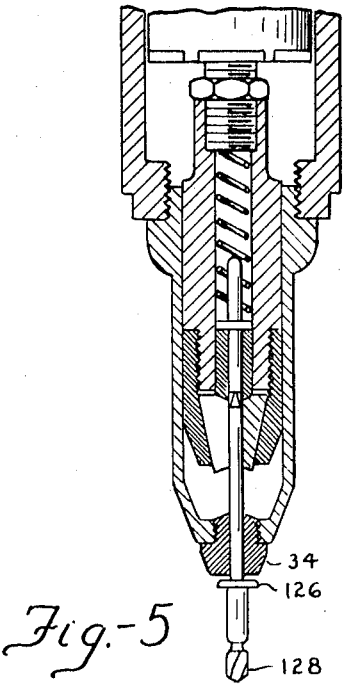
Figure 6:
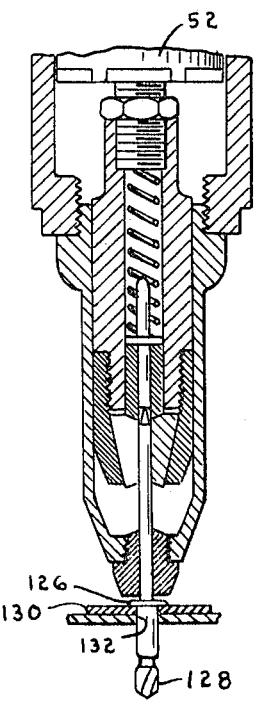
Figure 7:
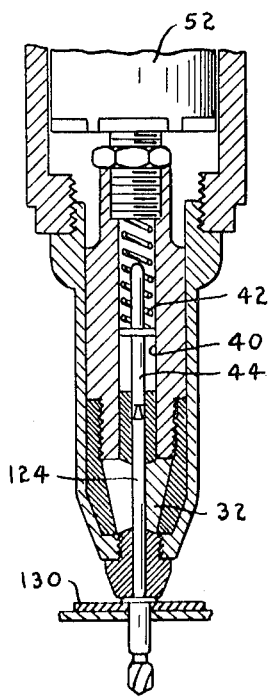
Figure 8:
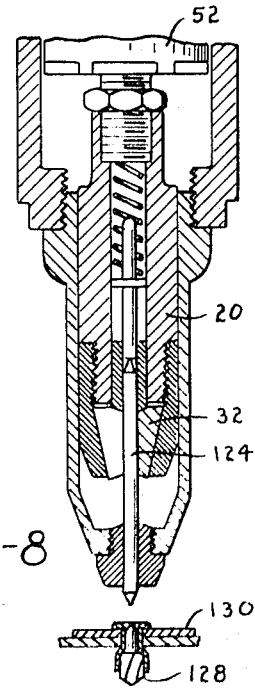

In the operation of my invention I connect blind rivet 108 to the jaw mechanism of my invention by inserting the stem portion of the rivet through nose plug 34 and between jaw elements 32 until the end of the stem abuts against the guide plug 48 and collared pin 44 in cylindrical member 20 as shown in FIG. 4. In this position the stem 124 of the blind rivet 108 is partially inserted in the jaw mechanism of my invention and is not tightly clamped therein. The reciprocating power unit is momentarily operated to draw back drill motor 52 and cylindrical member 20 so that jaw elements 32 may clamp upon the stem of the rivet. This operation longitudinally positions the blind rivet relative to nose plug 34 so that flange 126 of the rivet may rotate free of the nose plug as shown in FIG. 5. My invention is now ready for the drilling operation. The fluted end or head 128 of blind rivet 108 is placed against the structural members 130 (FIGS. 6–8) to be drilled which is accomplished by operating electric drill motor 52 through its switch means 58. When the tubular section of rivet 108 passes through the hole 132 drilled in structural members 130 and flange 126 abuts thereagainst, the rotating operation is stopped. The longitudinal positions of drill motor 52 and cylindrical member 20 are advanced to their forward most positions to release jaw elements 32 from their clamping posture on rivet stem 124 by effecting the release of the fluid pressure on piston 80 of hydraulic motor 76 and allowing coil spring 94 acting on piston 80 to return it to its forward position. Stem 124 of rivet 108 is longitudinally repositioned relative to jaw elements 32 in chuck sleeve 18 by manually pressing the tool of my invention against the rivet seated by the flange thereof against the structural members so that stem 124 is further inserted through the central hole 40 of cylindrical 20 against collared pin 44 and against the bias of spring 42 as shown in FIG. 7. The reciprocating power unit or hydraulic motor 76 is again actuated to retract drill motor 52 and cylindrical member 20 so that jaw elements 32 are wedged together to clamp against stem 124 of rivet 108 at a position nearer the tubular portion thereof. Continued pulling of drill motor 52 and cylindrical member 20 will cause the head 128 bearing against the tubular portion of the rivet to upset by annularly expanding and compressing tightly against structural members 130 and to uniformly deform into a clamping rivet at which point further pulling on stem 124 will cause it to rupture as shown in FIG. 8. Coil spring 42 will cause the ejection of ruptured stem 24 from nose plug 34, and is discarded, when jaw elements 32 act to release their grip on stem 24. This action occurs when drill motor 52 and cylindrical member 20 are moved forward in housing 12 and chuck sleeve 18, respectively.

It will be understood that this invention is susceptible to modification in order to adapt it to different usages and conditions, and, accordingly, it is desired to comprehend such modification within this invention as may fall within the scope of the appended claims.

I claim:
1. A rivet handling tool comprising:
   an elongated housing;
   a shaft rotating motor unit in said housing longitudinally movable in said housing;
   a rivet holding device connected to said shaft of said motor unit for rotation therewith;
   a sleeve member connecting one end of said housing for slidably containing said rivet holding device;
   a reciprocating motor unit supported at the other end of said housing; and
   a link member connecting said reciprocating motor unit and said shaft rotating motor unit.
2. The rivet handling tool of claim 1 wherein said rivet holding device is further characterized as comprising:
   a cylindrical member having a central bore axially therethrough,
      said cylindrical member connected at one end thereof to said shaft for rotation therewith;
   a collet member connecting the other end of said cylindrical member;
   jaw elements in said collet member for releasably clamping said rivet;
   a plug member slidably movable in said central bore of said cylindrical member; and
   a spring member in said central bore for biasly retaining said plug member in said central bore at the other end of said cylindrical member.
3. The rivet handling tool of claim 1 wherein said rivet holding device is further characterized as comprising;
   a cylindrical member having a central bore axially therethrough;
   a collet member connecting said cylindrical member to form an extension thereof,
      said collet member having an inwardly tapered circumferential wall;
   a plurality of jaw elements circumferentially positioned in said collet member having collet wall engaging sides longitudinally tapered and laterally arced;
   the end portion of said central bore in said cylindrical member being restricted in diameter;
   a collared pin slidably movable in said central bore and said restricted portion of said central bore; and
   a spring member provided in said central bore for urging said collared pin against said restricted portion of said central bore.
4. A rivet handling tool comprising:
   a housing;
   a shaft;
   a motor unit connecting said shaft for rotation thereof, said motor unit and shaft being longitudinally movable in said housing;
   a rivet holding mechanism connected to said shaft for rotation therewith;
   a second motor unit in said housing to provide a reciprocating movement;
   a rod connected to said first motor unit and said second motor unit for transmitting said reciprocating movement of said second motor unit to said first motor unit; and
   switch means for operating said first and second motor units in sequence.
5. A tool for combining a rotating and reciprocating movement comprising:
   a housing;
   a rotational motive means in said housing longitudinally movable therein;
   means in said housing for releasably clamping a workpiece connected to said rotational motive means for rotation thereby,
      said means for releasably clamping a workpiece being connected to said rotational motive means for longitudinal movement therewith;
   a reciprocating motive means in said housing;
   a rod connected to said reciprocating motive means and said rotational motive means; and
   switch means for individually controlling said rotational and reciprocating motive means.
6. A chuck mechanism for holding a workpiece for rotational and reciprocating movement comprising:
   a cylindrical member having means at one end thereof for connection to rotational and reciprocal motive means;
   said cylindrical member having a central bore therethrough;
   means carried by said cylindrical member at the other end thereof for holding said workpiece,
      said means comprising a collet member connecting said cylindrical member at the other end thereof to form an extension thereof, said collet member having an inwardly tapered circumferential wall, and
      a plurality of jaw elements positioned in said collet member having collet wall engaging sides longitudinally tapered and laterally arced;
   a plug member slidably movable in said central bore of said cylindrical member; and
   a spring member in said central bore for biasly positioning said plug member in said central bore at the other end of said cylindrical member.

References Cited

UNITED STATES PATENTS

| | | | |
|---|---|---|---|
| 2,283,708 | 5/1942 | Trautmann | 72—114 |
| 2,403,675 | 7/1946 | Mitchell | 72—391 |
| 2,445,067 | 7/1948 | Hiler | 72—391 |
| 2,583,733 | 1/1952 | Fischer | 72—114 |
| 3,047,182 | 7/1962 | Batten | 72—391 |
| 3,082,898 | 3/1963 | Bosch | 72—391 |
| 3,181,338 | 5/1965 | Zetterlund | 72—391 |
| 3,412,594 | 11/1968 | Lund | 72—391 |

CHARLES W. LANHAM, Primary Examiner

G. P. CROSBY, Assistant Examiner

U.S. Cl. X.R.

72—453